3,681,129
PROCESS FOR COLOR STABILIZING ELASTOMERIC STRUCTURES AND PRODUCTS PRODUCED THEREBY
Clifford C. Carroll, Spartanburg, S.C., assignor to Deering Milliken Research Corporation, Spartanbug, S.C.
No Drawing. Filed Aug. 21, 1970, Ser. No. 66,118
Int. Cl. B44d 1/22
U.S. Cl. 117—138.8 D                    15 Claims

ABSTRACT OF THE DISCLOSURE

A shaped structure of spandex-type elastomers stabilized against discoloration by a phosphorus composition comprising up to four moles of a urea, amine, epoxide, acid or acid anhydride per mole of a phosphonium compound having the formula:

$$[RCH(OH)]_4P^{\oplus}X^{\ominus}$$

wherein R is hydrogen or an alkyl radical and X is a halogen or a hydroxy radical. In addition to these phosphonium compounds, the structures also may be treated with a polymeric binder material which results in improved stabilization and durability.

BACKGROUND OF THE INVENTION

This invention relates to color-stabilized shaped structures of long chain synthetic elastomers which comprise at least 85% of a segmented polyurethane, and more particularly, to the stabilization of such elastomers through the use of particular phosphonium composition.

Long chain synthetic elastomers comprising at least 85% of a segmented polyurethane, generically referred to in the industry as "spandex" materials, can be formed into shaped structures such as molded objects, films, filaments, fibers, bristles, felts, and similar structures useful in a variety of applications. The structures exhibit desirable elastic properties and fibers and filaments of these elastomers have found wide acceptance in the women's undergarment industry as a result of their elasticity. One of the major problems associated with these materials is the tendency of the spandex to discolor on storage and upon exposure to atmospheric conditions. The discoloration primarily is in the form of an undesirable yellowing of the filaments and fibers. Thus it is common to witness the discoloration of white undergarments containing spandex even before the first wearing or laundering.

It has been suggested that the discoloration may be offset somewhat by tinting the fibers or through the use of other masking agents. However, such materials may cause the fibers to display other undesirable color characteristics since they do not inhibit the formation of the yellow color but merely mask the yellow color once it is formed.

In U.S. Pat. 3,133,036, a procedure for obtaining color-stabilized segmented polyurethane elastomers is described utilizing an essentially colorless leuco derivative of a blue-violet dye. The leuco derivative is converted to the dye by the oxidative action of nitric fumes or chlorine thereby masking any yellowing of the elastomer. In accordance with U.S. Pat. 3,230,193 stabilization of such elastomers is accomplished by incorporating therein triarylphosphines. However, these phosphorous compounds actually degrade the spandex when exposed to ultraviolet light. Benzanilide is described as a stabilizing additive in U.S. Pat. 3,095,322. It is known also that various derivatives of hydrazides may be used to stabilize the elastomers. In copending application Ser. No. 830,087, filed June 3, 1969, and now Pat. No. 3,624,179, a process for stabilizing spandex type yarns is described utilizing tetrakis (hydroxyalkyl) phosphonium salts. Although these salts provide satisfactory stabilization, the thus treated spandex products exhibit a somewhat unpleasant odor probably due to the presence of some phosphorus impurities.

SUMMARY OF THE INVENTION

In accordance with the present invention, color stabilized shaped structures of long chain synthetic elastomers comprising at least 85% of a segmented polyurethane are obtained by treating the elastomers with a phosphorus composition comprising up to four moles of a urea, amine, epoxide, acid or acid anhydride per mole of a phosphonium compound having the structure.

$$[RCH(OH)]_4P^{\oplus}X^{\ominus}$$

wherein R is hydrogen or an alkyl radical and X is a halogen or hydroxy radical. The phosphorus composition is applied to the elastomer by any of the known techniques such as by exhaustion from an aqueous bath or by padding. In addition to the phosphonium composition, the material applied to the elastomers may also contain polymeric binder materials such as aminoplast resins. These latter compositions provide improved color stabilization and washability to the treated elastomers. Elastomers treated in accordance with this invention exhibit improved color stabilization without noticeable odors.

DESCRIPTION OF THE PREFERRED EMBODIMENTS

The shaped structures prepared and treated in accordance with the invention may be in the form of filaments, fibers or films prepared, for example, by molding. The elastomers may be treated alone or may be incorporated in structures, such as fabrics, containing fibers of different compositions. Both natural and synthetic fibers, as well as blends thereof, may be included with the elastomers in the preparation of fabrics without impairing the stabilization of the elastomer. One class of fabrics which can be readily color-stabilized by the invention, are the powernet fabrics. The powernet fabrics are those known in the industry as the Raschel knitted fabrics, e.g., the 4-bar Raschel fabrics, having spandex, rubber, or other elastic fibers within the fabric. An example of such a fabric is one comprised of nylon and spandex fibers.

The term "spandex fiber," which is used in this specification and in the claims, is used in its generic sense to define a manufactured fiber in which at least 85% of the fiber-forming substance is a long-chain synthetic segmented polyurethane. The discussion, however, of spandex fibers is applicable also to other structures of such segmented polyurethanes since the stabilization is achieved with any shape such as films and the like.

The segmented polyurethanes which provide spandex fibers contain the recurring linkage —OCONH—. The preferred spandex fibers are those prepared from segmented polyurethanes in which the urethane nitrogen is joined to an aromatic radical which is further attached to a ureylene linkage—NHCONH—. Although these fibers exhibit the most desirable properties, they do suffer the disadvantage of being very susceptible to the degradative action of acid fumes. In general, the segmented polyurethanes are prepared from hydroxy-terminated prepolymers such as hydroxy-terminated polyethers and polyesters of low molecular weight. Reaction of the prepolymer with a molar excess of an organic diisocyanate, preferably an aromatic diisocyanate, produces an isocyanate-terminated polymeric intermediate which may then be chain extended with a difunctional active hydrogen-containing compound such as water, hydrazine, organic diamines, glycols, and amino alcohols.

The preparation of various types of segmented polyurethanes of the types treated in accordance with this invention is the subject matter of considerable prior art including the following U.S. patents: 2,929,801; 2,929,802; 929,803; 2,929,804; 2,953,839; 2,957,852; 2,962,470; 2,999,839; and 3,009,901. These patents describe the segmented poly urethane elastomers as being comprised of amorphous segments derived from polymers having a melting point below 50° C. and a molecular weight above 600, and containing from about 5 to 40% of crystalline segments derived from a polymer having a melting point above 200° C. in the fiber-forming molecular weight range. Most of the polyurethanes have elongations, in filament form, greater than 150%, tensile recoveries of over 90%, and stress decays of less than 20%, as defined in U.S. Pat. 2,957,852.

The phosphonium compounds useful in the preparation of the phosphorus compositions applied to the shaped structures in accordance with the present invention are phosphonium salts having the formula

wherein R is hydrogen or an alkyl radical and X is a halogen or a hydroxy radical. The alkyl radicals are preferably lower alkyl radicals containing, for example, from 1 to about 10 or 15 carbon atoms. The alkyl radicals may be straight chain or branched alkyl radicals. Phosphonium salts of this type are prepared from the reaction of phosphine with an aldehyde (RCHO) and a mineral acid in an inert solvent such as tetrahydrofuran. This procedure is described in detail in U.S. Pat. 3,013,085. Typical examples of such phosphonium salts include those where R is $n$-$C_5H_{11}$ and X is chlorine; R is $n$-$C_3H_7$ and X is bromine; and R is $n$-$C_5H_{11}$ and X is iodine. The corresponding hydroxy derivatives are obtained by hydrolysis of the corresponding halides. In the presence of alkali metal hydroxides or neutral carbonates, the salts are transformed to more complex mixtures containing tris (hydroxyalkyl) phosphine oxides and/or the corresponding phosphine, aldehydes and hydrogen. Thus, some of the phosphine oxide or phosphine may also be deposited on the elastomers by the process of the invention.

As mentioned above, the phosporus compositions applied to the elastomeric structures comprise a phosphonium compound of the type described above reacted with up to four parts of a urea, amine, epoxide acid or acid anhydride. Urea and nitrogen substituted alkyl ureas such as N-methyl urea and N,N'-dimethyl urea are useful. Monomeric, primary and secondary amines readily react with the above-described phosphonium compounds and particularly with the phosphonium halides. The reaction is exothermic and takes place readily at room temperature. Examples of useful amines include cetylamine, melamine (a cyclic trimer of cyanamide), methylolmelamines and ethylenimine.

Polybasic acids and anhydrides also can be reacted with the phosphonium compound to form useful phosphorus compositions of the invention. Both aliphatic and aromatic acids and anhydrides are utilized. Examples of such acids include acrylic acid, methacrylic acid, maleic acid, maleic anhydride, etc. The preparation of some of these phosphorus compositions is described in Industrial and Engineering Chemistry, vol. 48, pp. 64–67 (1956).

The epoxides which are useful for the preparation of phosphorus compounds are primarily monomeric or low molecular weight polymeric epoxides. Virtually any epoxy compound that contains terminal epoxy groups can be reacted with the phosphonium compounds in accordance with the present invention, and the epoxy compound can be one prepared by substantially any of the known processes for producing epoxy compounds such as, for example, by reacting epichlorohydrin or epibromohydrin with polyhydric alcohols, phenols, etc. Both aliphatic and aromatic polyhydric epoxy compounds are useful in this invention and these are available under a variety of trade names such as Epon, Araldite, Bakelite, etc. Specific examples of the useful epoxides include the diglycidol ether of glycerin (Eponite 100 available commercially from Shell Chemical Company); Dow Epoxy Resin 732 which is a low viscosity resin having the general structure

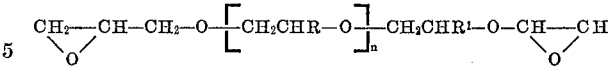

wherein $n$ is about 5.6; diepoxides based on the reaction of epichlorohydrin with bisphenol A such as Epon 828 (available commercially from Shell Chemical Company).

The ratio of phosphonium compound to urea, amine, epoxide, acid or acid anhydride in the phosphorus composition applied to the elastomers in accordance with the invention may vary over a wide range from an excess of one reagent to an excess of another reagent. Generally, however, each mole of the phosphonium compound is reacted with up to about 4 moles of the other reactant and preferably with from about 1 to 2 moles of the other reactant. Acidic or basic catalysts can be employed if desired. Suitable acid catalysts include organic and inorganic acids such as phosphoric acid, acetic acid and butyric acid. Suitable basic catalysts include the alkali metal carbonates or bicarbonates, ammonia, organic amines such as triethylamine and quaternary ammonium hydroxides. The reaction can be conducted in the presence or absence of a solvent which can be an organic solvent or water. As mentioned previously, the reaction of some of the above combinations of phosphonium compounds and other reagents is exothermic while other mixtures must be heated in order to effect the reaction. Generally, the reaction mixture is maintained at a temperature of about 80 to 90° C. for periods up to 30 to 45 minutes or until the exothermic reaction subsides.

The preparation of the phosphorus composition utilized in this invention is illustrated by the preparation of the following compositions. Unless otherwise indicated, all parts are by weight.

COMPOSITION A

A mixture of 49 parts of water, 44.6 parts of tetrakis (hydroxymethyl)phosphonium chloride (80% solids) and 22.4 parts of urea is heated to a temperature of about 80° C. and maintained at this temperature for 30 minutes. The mixture is then cooled to a temperature of 38° C. and filtered. The filtrate is a solution of the desired product (50% solids) having a pH of 1.55 and a Brookfield viscosity as determined with a No. 1 spindle at 30 r.p.m. of 4 centipoises. The infrared spectrum of the filtrate exhibited strong amide absorbtion.

COMPOSITION B

The procedure for the preparation of Composition A is repeated except that the mixture comprises 197 parts of the phosphonium chloride, 50 parts of urea and 472 parts of water.

COMPOSITION C

A mixture of 60 parts of the phosphonium chloride used in the preparation of Composition A (80% solids), 3 parts of triethanolamine and 60 parts of 1,2,4,5 - diepoxy-3-pentanol is stirred and heated to a temperature of 45° C. whereupon an exothermic reaction occurs. The mixture is allowed to reach a temperature of about 80–92° C. and is maintained at this temperature for 45 minutes. A viscous pale yellow liquid is obtained, and sufficient water is added to provide a solution containing 50% solids. The pH of this solution is 6.9.

COMPOSITION D

A mixture of 120 parts (1 mole) of tetrakis hydroxymethyl phosphonium chloride (80% solids), 120 parts (4 moles) of urea and 192 parts of water are stirred and heated to a temperature of about 75° C. over a period of 15 minutes. The mixture is maintained at a temperature of 75–80° C. for 20 minutes and cooled. The pH of this solution is raised from an initial value of 0.5 to 5.3 by the addition of 16 parts of sodium bicarbonate.

COMPOSITION E

To 36 parts of cetylamine and 290 parts of ethyl alcohol is added 17 parts of tetrakis hydroxymethyl phosphonium chloride (80% solids) and 3.5 parts of sodium carbonate. A gel precipitates in about one minute, and the supernatant liquid is removed. The gel is washed several times in warm ethyl alcohol and dried at a temperature of about 50° C. This phosphorus composition has a melting point of about 70–90° C. and contains 5.5% phosphorus and 4.4% nitrogen.

COMPOSITION F

A mixture of 200 parts of the phosphonium chloride used in the preparation of Composition A, 60 parts of melamine and 20 parts of sodium carbonate is stirred in 35 parts of water and heated to a temperature of about 65° C. for about 20 minutes. The product is isolated by adding the reaction mixture to an excess of ethyl alcohol whereupon a white precipitate is obtained which is the desired phosphorus composition.

COMPOSITION G

The procedure for the preparation of Composition E is repeated except an equivalent amount of maleic acid is utilized in lieu of the cetylamine.

COMPOSITION H

A mixture of 60 parts of the phosphonium chloride utilized in the preparation of Composition A, 42.5 parts of Epon 828 (a commercially available diepoxide based on epichlorohydrin and bisphenol A, available from Shell Chemical Company), and 2 parts of triethanolamine is stirred vigorously and heated to a temperature of about 105° C. whereupon an exothermic reaction occurs. When the temperature reaches 115° C., the reaction mixture is cooled with ice water to a temperature of about 95° C. and held at this temperature for about 15 minutes. Upon cooling further, a clear, yellow, viscous liquid is obtained which is the desired product.

COMPOSITION I

The procedure for the preparation of Composition A is repeated except that the phosphonium chloride is replaced by an equivalent amount of tetrakis (1-hydroxyheptyl) phosphonium chloride as prepared in U.S. Pat. 3,013,085.

COMPOSITION J

The procedure for the preparation of Composition A is repeated except that the phosphonium chloride is replaced by an equivalent amount of tetrakis (1-hydroxypropyl) phosphonium bromide as prepared in Example IV of U.S. Pat. 3,013,085.

The phosphorus composition may be applied to the shaped structures by a variety of procedures. The compositions may be dissolved in a solution of a segmented polyurethane prior to formation of the fibers or filaments, although the structures are preferably treated by other methods. For example, when treating fibers or filaments, the phosphorus composition can be dissolved in a suitable organic solvent which does not react with the fibers, or they may be dissolved in water, and the fibers or fabrics treated by passing them through one of the treating solutions. In such "dipping" or "exhaustion" techniques, the fiber is maintained in contact with the solution for a period of time sufficient to insure that the desired amount of the composition is retained by the fiber upon being removed from the solution. The required amount of phosphorus composition is that amount which is necessary to color stabilize the fibers. Generally, amounts of from about 1.0% to about 15% and more preferably up to about 10% of the phosphonium salts based on the weight of the elastomer in the structure are sufficient to provide the required stabilization. The time, therefore, may vary from a few seconds to an hour or more with the solution being maintained at room temperature.

Alternatively, the phosphorus composition can be applied to the shaped structures by padding, brushing, printing, etc. Padding is a particularly preferred process where the composition applied to the structure contains a polymeric binder material in addition to the phosphorus composition and where the structure is a fabric. The polymeric binder materials utilized in the invention include both monomers and polymers which when applied to the structures and reacted under the proper conditions, undergo polymerization and/or condensation whereby they are transformed to the thermoset state. Polymeric materials that may be employed in accordance with the present invention include epoxy, acetal, and aminoplast resins. The aminoplast resins are preferred, and examples of these nitrogen containing resins include the urea-formaldehyde adducts such as propyleneurea-formaldehyde and dimethylolurea; melamine-formaldehyde resins such as trimethylol melamine; ethyleneurea-formaldehydes such as dimethylolethyleneurea; alkylol amides such as methylol formamide; alkyl acrylamides such as N-methylolacrylamide; triazones such as dimethylol-N-ethyl triazone; and urons such as dimethyloluron. Mixtures of such resins are also useful in the invention.

The amount of the binder material employed in the invention is primarily determined by the nature of the structure being treated and the ultimate use of the structure. Small amounts of the binder afford some improvement whereas larger amounts may afford greater improvement. However, the larger amounts of binder generally adversely affect the hand of the fabric. Therefore, the amount of binder employed is preferably that which will afford the desired amount of binding while not adversely affecting the aesthetic properties. Generally, the amount utilized will be up to about 20 or 30% by weight with amounts between 2 and 10% by weight of the structure being preferred.

When polymeric materials are included in the compositions applied to the structures of the invention, catalysts may be included also. The nature of the catalyst employed depends on the specific polymeric binder material. For example, if the binder material has a functional group that is reactive under acidic conditions, then an acid catalyst is used. On the other hand, when a functional group is present that is reactive under alkaline conditions, then a base catalyst is used. The most common acid acting catalysts are the metal salts such as magnesium chloride, zinc nitrate and zinc fluoroborate, or the amino salts such as mono-ethanolamine hydrochloride and 2-amino-2-methylpropanol. Base acting catalysts include alkali metal salts such as alkali metal carbonates which decompose at temperatures in excess of about 80° C. to form a stronger base alkali metal oxide. Additional base acting catalysts include potassium bicarbonate, sodium silicate, alkali metal phosphates and quaternary ammonium hydroxides. The amount of catalyst incorporated in the compositions applied to the structures of the invention is that normally used to activate a paricular binder material. Generally, up to about 15% by weight of the catalyst is included in the application solution with a preferred range being from about 0.1 to about 7%.

As mentioned previously, the principal advantage obtained by the present invention is the preparation of synthetic elastomeric structures which are stabilized from yellowing due to gas fumes and which do not have undesirable odors. It has been found also that the process of the invention provides color stabilized elastomeric structures exhibiting the desired stabilization and having improved durability to washing. Particularly improved results are obtained when the phosphonium salt is used in conjunction with the polymeric binder material. Color stabilization obtained from this combination is better than the stabilization obtained through the use of either of the components.

The ability of the treated structures of this invention to resist yellowing is determined by subjecting treated samples to an accelerated fume-fading test in accordance with the procedure described on pp. B-87 to B-89 of the Technical Manual of the American Association of Textile Chemists and Colorists, vol. 44 (1968). This standard test procedure is identified as AATCC Standard Test Method 23-1962. In this test, test specimens are suspended in a gas fading test chamber, and a gas burner is lighted to generate fumes comprising the oxides of nitrogen. The length of exposure of these fumes may be varied depending on the particular specimens being tested and the objectives of the test. Generally, from 16 to 20 hours exposure is sufficient. After exposure for the desired length of time, the effect on the color of the specimen may be defined by reference to the International Geometric Gray Scale.

Alternatively, the degree of yellowness resulting from the accelerated tests can be determined with a spectrophotometer or with a reflectometer or colorimeter having green and blue source-filter-photo detector combinations. This method for determining the degree of yellowness is known in the industry as the Hunter Whiteness Test and the procedure is described on pp. 1056–1059 of the 1967 Book of ASTM Standards, part 30, published by the American Society for Testing and Materials, Philadelphia, Pa. Values are obtained in accordance with the procedure for lightness (L), whiteness (L–3$b$), and degree of yellowness ("$b$" value). A negative "$b$" value indicates blueness whereas positive "$b$" values indicate yellowness.

The following examples illustrate the process of the invention and the products obtained thereby. Unless otherwise indicated, all parts and percentages are by weight.

EXAMPLE 1

An aqueous bath comprising 5 parts of Composition D, 1 part of Carbowax 550 (a polyethylene glycol), 0.1 part of a wetting agent obtained by reacting 9.5 moles of ethylene oxide with 1 mole of nonyl phenol and about 95 parts of water is applied to a powernet fabric comprised of 30% of a spandex fiber and 70% nylon filament yarn to provide a pickup of 5% of Composition D based on the weight of the fabric. This treated powernet fabric exhibited improved resistance to fume fading.

EXAMPLE 2

A treating composition is prepared from 20 parts of Composition A, 6 parts of Rhonite R-1 (a dimethylolethylene urea resin available commercially from Rohm and Haas Company), 0.1 part of the wetting agent used in Example 1, 2 parts of a commercial softener and about 70 parts of water. This composition is applied by padding to a pickup of about 60% and drying to a knitted tricot fabric containing 22.6% Lycra (a Du Pont spandex) and 77.4% Antron nylon (Du Pont trilobal nylon).

The above-prepared fabric was subjected to the gas-fume test described previously for a period of 16 hours whereupon the relative degree of yellowness was measured using the Hunter procedure described previously. After exposure, the fabric had a lightness (L) value at 95.1 (average of four values, two on the face of the sample and two on the back of the sample folded in half), a whiteness value (L–3$b$) of 101.7 and a degree of yellowness ($b$) of −2.2. Untreated control fabric subjected to the same test has a lightness value of 92.2, a whiteness value of 74.8 and a degree of yellowness of +5.8. No significant undesirable odors are observed in the treated fabrics.

EXAMPLE 3

A mixture of 4 parts of Melrez MF (a melamine-formaldehyde resin available from Synthron Inc.), 15 parts of Composition A, 4.5 parts of Carbowax 550, 0.1 part of the wetting agent used in Example 1 and about 80 parts of water is prepared, padded onto the powernet fabric described in Example 1 (pickup of about 60%), dried and cured for 60 seconds at a temperature of 140° C. This fabric has a whiteness retention value after 20 hours fume exposure at 140° F. of 88.6 as determined by AATCC test method No. 23–1962 described earlier. This treated fabric also exhibited excellent antistatic characteristics with no significant undesirable odors.

EXAMPLE 4

An aqueous solution comprising 3 parts of Melrez MF resin, 15 parts of Composition A, 4.5 parts of Carbowax 550, 0.1% of wetting agent and 75 parts of water is applied to a knitted tricot fabric containing 22.6% Lycra (a Du Pont spandex fabric) and 77.4% nylon, (pickup of about 60%) dried and cured for 60 seconds at 140° C. This treated fabric had a whiteness retention value (after 20 hours fume exposure at 140° F.) of 97.7 and exhibited excellent antistatic characteristics.

That which is claimed is:

1. A shaped structure of a long chain synthetic elastomer comprising at least 85% of a segmented polyurethane stabilized against discoloration by the presence of a phosphorus composition comprising the reaction product of up to about four moles of a urea, amine, epoxide, organic acid or acid anhydride per mole of a phosphonium compound having the formula $$[RCH(OH)]_4P^{\oplus}X^{\ominus}$$

wherein R is hydrogen or an alkyl radical and X is a halogen or a hydroxy radical, said composition being present in an amount sufficient to stabilize the structure from discoloration.

2. The structure of claim 1 wherein R is hydrogen.
3. The structure of claim 1 wherein said composition is present in an amount of from 0.1 to about 15% by weight of said structure.
4. The structure of claim 1 wherein R is a lower alkyl radical and X is chlorine.
5. The structure of claim 1 wherein the composition is derived from urea.
6. The structure of claim 1 wherein the composition comprises one mole of tetrakis (hydroxymethyl) phosphonium chloride for each two moles of urea.
7. The structure of claim 1 wherein up to about 20% by weight of a polymeric binder material also is present.
8. The structure of claim 7 wherein the binder material is an aminoplast resin.
9. A spandex fiber stabilized against discoloration by the presence of a phosphorus composition comprising the reaction product of up to about four moles of a urea, amine, epoxide, acid, or acid anhydride per mole of a phosphonium compound having the formula $$[RCH(OH)]_4P^{\oplus}X^{\ominus}$$

wherein R is hydrogen or an alkyl radical and X is a halogen or hydroxy radical, said composition being present in an amount sufficient to stabilize the fiber against discoloration.

10. The fiber of claim 9 wherein the composition is present in an amount of from about 0.1 to about 15% by weight of the fiber.
11. The fiber of claim 9 wherein R is hydrogen and X is chlorine.
12. A process for color stabilizing structures comprising long chain synthetic elastomers comprised of at least 85% of a segmented polyurethane which comprises applying thereto a phosphorus composition comprising the reaction product of up to about four moles of a urea, amine, epoxide, organic acid or acid anhydride per mole of a phosphonium compound having the formula $$[RCH(OH)]_4P^{\oplus}X^{\ominus}$$

wherein R is hydrogen or an alkyl radical and X is a halogen or hydroxy radical.

13. The process of claim 12 wherein the composition is applied to the structure by immersing the structure in a bath containing said composition for a period of time sufficient to deposit from about 0.1 to about 15% by weight of the composition on the structure.

14. The process of claim 12 wherein the bath also contains a polymeric binder material.

15. A process for preparing color stabilized spandex fibers which comprises applying thereto an aqueous mixture comprising an aminoplast resin and a phoshporus composition comprising the reaction product of up to about four moles of a urea, amine, epoxide, organic acid or acid anhydride per mole of a phosphonium compound having the formula

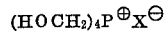

wherein X is chlorine or a hydroxy radical to provide from about 0.5 to 10% by weight of the composition on the fibers, and thereafter drying and curing said composition.

References Cited
UNITED STATES PATENTS

| | | | |
|---|---|---|---|
| 3,428,480 | 2/1969 | Wagner et al. | 117—136 |
| 3,434,981 | 3/1969 | Baranauckas et al. | 117—143 A |
| 3,624,179 | 11/1971 | Carroll | 260—830 P |
| 3,230,193 | 1/1966 | Moulds et al. | 260—45.7 |
| 2,809,941 | 10/1957 | Reeves et al. | 117—136 X |

MURRAY KATZ, Primary Examiner

T. G. DAVIS, Assistant Examiner

U.S. Cl. X.R.

117—136, 161 LN; 260—45.9 R, 830 P, 849, 858